(12) United States Patent
Lalgudi

(10) Patent No.: US 11,932,721 B2
(45) Date of Patent: Mar. 19, 2024

(54) BIO-BASED POLYOLS, ESTERS, AND SURFACTANTS

(71) Applicant: Ramanathan S Lalgudi, Westerville, OH (US)

(72) Inventor: Ramanathan S Lalgudi, Westerville, OH (US)

(73) Assignee: Ramanathan S. Lalgudi, Westerville, OH (US)

( * ) Notice: Subject to any disclaimer, the term of this patent is extended or adjusted under 35 U.S.C. 154(b) by 0 days.

(21) Appl. No.: 18/080,906

(22) Filed: Dec. 14, 2022

(65) Prior Publication Data

US 2023/0183412 A1 Jun. 15, 2023

Related U.S. Application Data

(60) Provisional application No. 63/289,525, filed on Dec. 14, 2021.

(51) Int. Cl.
| | |
|---|---|
| *C08G 18/12* | (2006.01) |
| *B01J 13/14* | (2006.01) |
| *B01J 13/18* | (2006.01) |
| *C08G 18/08* | (2006.01) |
| *C08G 18/32* | (2006.01) |
| *C08G 18/34* | (2006.01) |
| *C08G 18/36* | (2006.01) |
| *C08G 18/42* | (2006.01) |
| *C08G 18/75* | (2006.01) |
| *C08G 18/76* | (2006.01) |

(52) U.S. Cl.
CPC ............ *C08G 18/12* (2013.01); *B01J 13/14* (2013.01); *B01J 13/185* (2013.01); *C08G 18/0823* (2013.01); *C08G 18/3203* (2013.01); *C08G 18/3206* (2013.01); *C08G 18/3293* (2013.01); *C08G 18/348* (2013.01); *C08G 18/36* (2013.01); *C08G 18/4283* (2013.01); *C08G 18/755* (2013.01); *C08G 18/7621* (2013.01)

(58) Field of Classification Search
CPC .. C08G 18/12; C08G 18/3203; C08G 18/348; C08G 18/36; C08G 18/0823; C08G 18/3206; C08G 18/3293; C08G 18/4283; C08G 18/755; C08G 18/7621; B01J 13/185; B01J 13/14
See application file for complete search history.

(56) References Cited

U.S. PATENT DOCUMENTS

| | | | |
|---|---|---|---|
| 4,487,853 A | 12/1984 | Reichel et al. | |
| 5,155,163 A * | 10/1992 | Abeywardena | C09J 175/04 524/591 |
| 6,384,009 B1 | 5/2002 | Koester et al. | |
| 2008/0154053 A1 | 6/2008 | Erhan et al. | |
| 2009/0270581 A1 | 10/2009 | Tielmans et al. | |
| 2018/0022955 A1 | 1/2018 | Koyma et al. | |

FOREIGN PATENT DOCUMENTS

| | | | | |
|---|---|---|---|---|
| WO | WO-2007062158 A2 * | 5/2007 | ........... | C07D 317/30 |
| WO | WO-2016069622 A1 * | 5/2016 | ............. | C08G 18/14 |

OTHER PUBLICATIONS

International Search Report of Application No. PCT/US2022/052770 dated Feb. 28, 2023.

\* cited by examiner

*Primary Examiner* — Rabon A Sergent
(74) *Attorney, Agent, or Firm* — Lippes Mathias LLP

(57) ABSTRACT

The present disclosure relates to methods for making polyols, esters, and surfactants. Generally, a carboxyl-containing molecule is reacted with an epoxide-containing molecule to obtain a hydroxylated ester. If multiple epoxide groups are present in the epoxide-containing molecule, the resulting molecule can also be considered a polyol. The hydroxyl groups can be further ethoxylated to obtain a surfactant/stabilizer.

20 Claims, 6 Drawing Sheets

BIO-BASED POLYOLS, ESTERS, AND SURFACTANTS

CROSS-REFERENCE TO RELATED APPLICATIONS

This application claims priority to U.S. Provisional Patent Application Ser. No. 63/289,525, filed on Dec. 14, 2021, which is incorporated by reference in its entirety.

BACKGROUND

The present disclosure relates to methods for making bio-based polyols, esters, and surfactants. The polyols and esters may be useful for producing water-based polyurethane dispersions, in one application. The surfactants may be useful in applications requiring surfactants, particularly branched surfactants. Other applications are also contemplated.

BRIEF DESCRIPTION

The present disclosure relates to methods for making polyols, esters, and surfactants (also called stabilizers depending on the application/industry). Generally, a carboxyl-containing molecule is reacted with an epoxide-containing molecule to obtain a hydroxylated ester. If multiple epoxide groups are present in the epoxide-containing molecule, the resulting molecule can also be considered a polyol. The hydroxyl groups can be further ethoxylated to obtain a surfactant/stabilizer. Methods and mixtures including the hydroxylated ester are also described for forming polymeric particles.

These and other non-limiting aspects of the disclosure are more particularly set forth below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
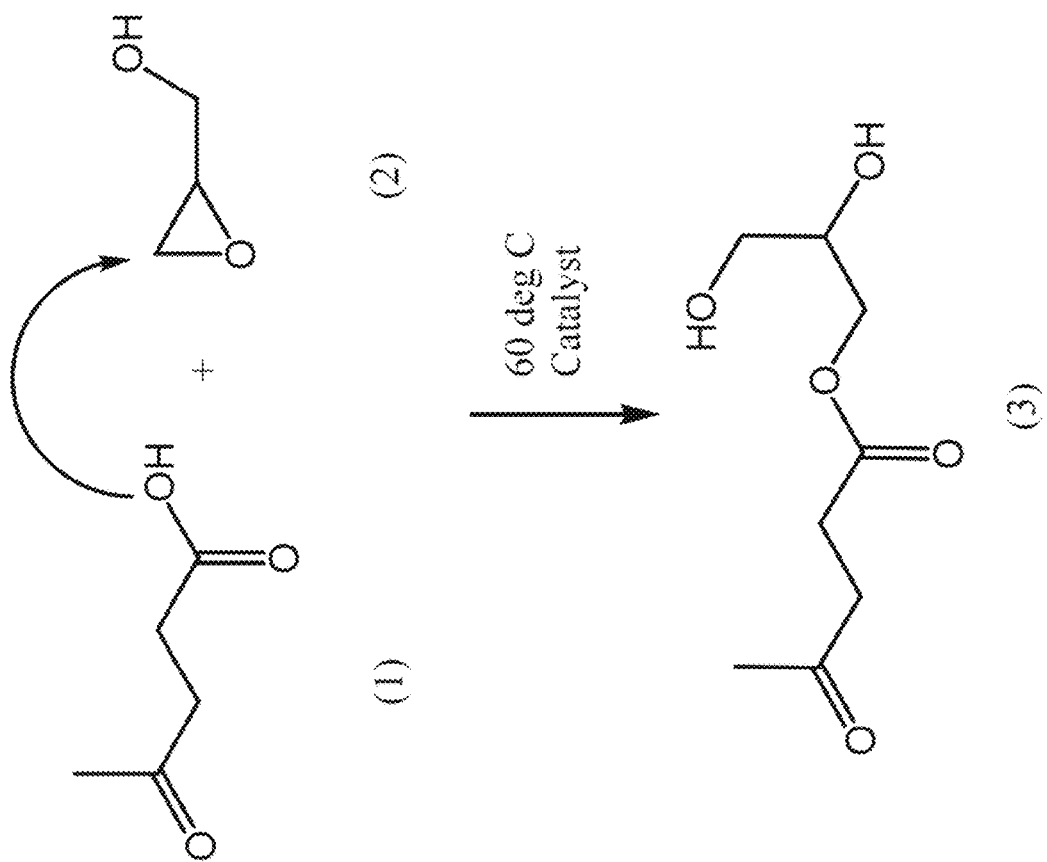
FIG. 1 is a drawing illustrating a first example of the methods and products of the present disclosure, in accordance with the present disclosure.

The present disclosure may be understood more readily by reference to the following detailed description of desired embodiments and the examples included therein. In the following specification and the claims which follow, reference will be made to a number of terms which shall be defined to have the following meanings.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The term "comprising" is used herein as requiring the presence of the named components/steps and allowing the presence of other components/steps. The term "comprising" should be construed to include the term "consisting of", which allows the presence of only the named components/steps.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

The modifier "about" used in connection with a quantity is inclusive of the stated value and has the meaning dictated by the context. When used in the context of a range, the modifier "about" should also be considered as disclosing the range defined by the absolute values of the two endpoints. For example, the range of "from about 2 to about 10" also discloses the range "from 2 to 10." The term "about" may refer to plus or minus 10% of the indicated number. For example, "about 10%" may indicate a range of 9% to 11%, and "about 1" may mean from 0.9-1.1.

The present disclosure relates to bio-based molecules which can be useful as polyols, esters, and/or surfactants (also called stabilizers depending on the application/industry).

The need for green and environmentally safe coatings creates an opportunity for bio based raw materials. Vegetable oil polyols (VOP) are the major source of bio based raw materials for making polyurethanes. Despite their wide commercial availability, they have not been utilized for making water based polyurethane (PU) coatings, because, the VOPs have no performance-enhancing functional groups in their molecular architecture/structure. Therefore, they are unable to meet the stringent corrosion, UV and solvent resistance performance requirements.

The present disclosure relates to bio-based polyols which include a cross-linking functional group that is free from toxic chemicals and has superior performance. Very generally, a carboxyl-containing molecule is reacted with an epoxide-containing molecule to obtain a hydroxylated ester. Either or both of the molecules can be derived from bio-based sources. The hydroxylated ester can have multiple hydroxyl groups, and may be useful in making water-based polyurethane dispersions. These molecules can also be considered branched alcohols, as they should always have at least one hydroxyl group.

The term "carboxyl" refers to a radical of the formula —CO—OR, where R is hydrogen or alkyl, and also refers to the salt thereof. The carboxy radical bonds through the carbon atom. It is noted that the carboxyl radical should not be considered a carbonyl radical or a hydroxyl radical even though it contains those two radicals, as it participates in reactions differently from those two radicals.

The term "alkyl" refers to a radical composed entirely of carbon atoms and hydrogen atoms which is fully saturated. The alkyl radical may be linear, branched, or cyclic. The alkyl radical has the ability to form a single bond to one or two different non-hydrogen atoms, depending on the context. For example, the formulas —$CH_2$—$CH_3$ and —$CH_2$—$CH_2$— should both be considered alkyl. As used herein, an alkyl group has from 1 to about 28 carbon atoms.

The term "epoxide" refers to a cyclic ether with a three-atom ring formed from an oxygen atom and two carbon atoms.

The term "hydroxyl" refers to the —OH radical.

The term "ester" refers to a radical of the formula —O—CO—, which forms covalent bonds to two different carbon atoms.

The term "isocyanate" refers to a radical of the formula —N=C=O.

FIG. 1 is a drawing illustrating a first example, in accordance with the present disclosure. Here, the carboxyl-containing molecule (1) is levulinic acid. The epoxide-containing molecule (2) is glycidol. When reacted at 60° C. in the presence of catalyst, the hydroxylated ester (3) obtained is 2,3-dihydroxypropyl levulinate. It is noted that the resulting hydroxylated ester has two hydroxyl groups.

Figure 2:
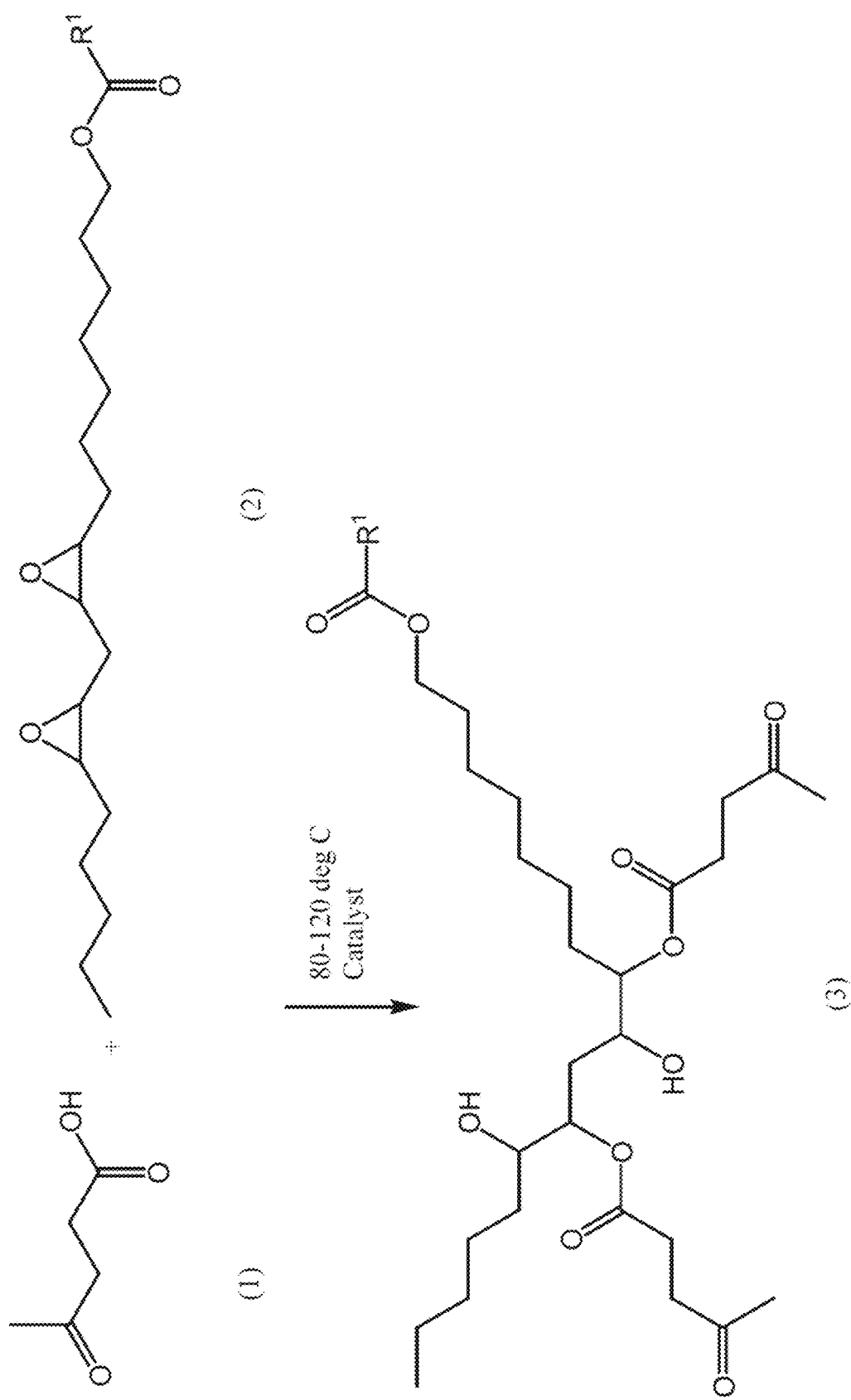
FIG. 2 is a drawing illustrating a second example of the methods and products of the present disclosure, in accordance with the present disclosure.

FIG. 2 is a drawing illustrating a second example, in accordance with the present disclosure. Here, the carboxyl-containing molecule (1) is levulinic acid. The epoxide-containing molecule (2) is an epoxidized triglyceride, which is illustrated here with two epoxide groups. Only one fatty acid chain is shown, and $R^1$ is a triglyceride fraction. When reacted at about 80° C. to about 120° C. in the presence of catalyst, the hydroxylated ester (3) obtained is a branched beta-hydroxy levulinate ester of the fatty acid. Each epoxide group has been converted to a hydroxy group.

More generally, any epoxide functional molecule with two or more epoxide/oxirane groups can be utilized to obtain a myriad of different resulting hydroxylated esters. For example, the reaction of levulinic acid with epoxidized soybean oil (illustrated in FIG. 2) would result in a soy polyol with cross linkable levulinic ester groups in the final product.

Figure 3:
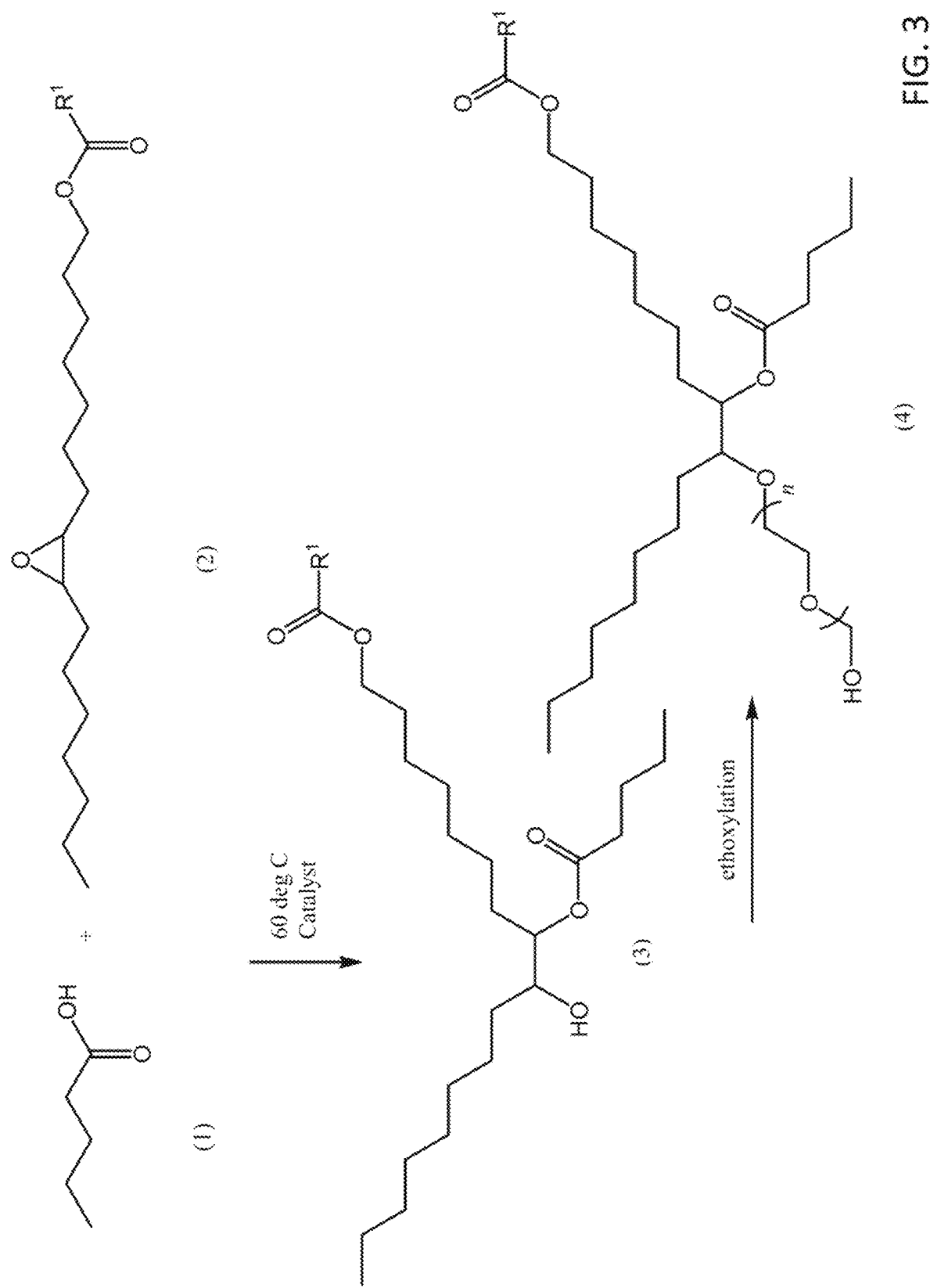
FIG. 3 is a drawing illustrating a third example of the methods and products of the present disclosure, resulting in a surfactant/stabilizer.

The hydroxyl group(s) present on the hydroxylated ester may also be ethoxylated to obtain a surfactant/stabilizer. An example of this reaction is shown in FIG. 3. Here, the carboxyl-containing molecule (1) is pentanoic acid. The epoxide-containing molecule (2) is an epoxidized triglyceride, which is illustrated here with one epoxide group on the fatty acid chain. Again, $R^1$ is a triglyceride fraction. When reacted at about 60° C. in the presence of catalyst, the hydroxylated ester (3) obtained is a branched beta-hydroxy ester of the fatty acid. The hydroxyl group of the branched ester (3) can then be ethoxylated to obtain a surfactant/stabilizer which includes both a polar chain and non-polar chains. In embodiments, n may range from 1 to about 30.

More generally, the carboxyl-containing molecule contains a total of at least two carbon atoms. In more particular embodiments, the carboxyl-containing molecule contains a total of from two to five carbon atoms, or a total of from two to 10 carbon atoms, or the carboxyl-containing molecule contains a total of up to 28 carbon atoms. The carboxyl-containing molecule may contain only one carboxyl group, or may contain multiple carboxyl groups. In some embodiments, the carboxyl-containing molecule also contains a carbonyl group or multiple carbonyl groups. Specific non-limiting examples of carboxyl-containing molecules include levulinic acid; an amino acid like aspartic acid, glutamic acid, glutamine, or serine; acetic acid, propionic acid, lactic acids, fatty acids; pyruvic acid, acetoacetic acid, 12-oxooctadecanoic acid, 3-oxocyclohexanecarboxylic acid, 4-oxo-2-cyclohexene-1-carboxylic acid, and 3-oxocyclopentanecarboxylic acid.

The term "carbonyl" or "ketone" refers to a radical of the formula —CO—, which forms covalent bonds to two different carbon atoms.

The carboxyl-containing molecule may also contain other polar groups, such as those containing phosphorus or sulfur. Examples include phosphoryl groups, phosphate groups, sulfonic acids, and sulfonyl groups. Non-limiting examples may include 2-[hydroxy(methyl)phosphoryl]acetic acid; 2-phosphonoacetic acid; carboxymethylphosphinic acid; 2-[(carboxymethyl)(hydroxy)phosphoryl]acetic acid; 2-(dimethylphosphoryl)acetic acid; 2-[bis(carboxymethyl)phosphoryl]acetic acid; sulfoacetic acid, 3-sulfopropanoic acid; 2,2-disulfoacetic acid; 2-hydroxy oxoethanesulfonatel 2-acetyloxysulfonylacetic acid; and 2-sulfinoacetic acid.

In particular embodiments, the epoxide-containing molecule contains two or more epoxide groups. While any number of epoxide groups is contemplated, usually at most 20 epoxide groups are present—for example, a triglyceride molecule may have such a number of epoxide groups when the three fatty acid chains are considered together. In some embodiments, the epoxide-containing molecule also contains a carboxyl group, for example if the epoxide-containing molecule is a fatty acid. The epoxide-containing molecule may be a triglyceride, such as an epoxidized soy oil. Another example of an epoxide-containing molecule is vernolic acid, which can be found in vernonia oil. In some particular embodiments, the epoxide-containing molecule is selected so that the resulting hydroxylated ester has at least two hydroxyl groups. This may be done, for example, by having multiple epoxide groups or by also having one or more hydroxyl groups.

The resulting hydroxylated ester may contain one hydroxyl group, or can contain at least two hydroxyl groups. In particular embodiments, the hydroxylated ester contains at most 20 hydroxyl groups, or from two to 20 hydroxyl groups. In particular embodiments, the hydroxylated ester is a hydroxy keto ester, i.e. contains at least one hydroxyl group, at least one ketone/carbonyl group, and at least one ester group. In more specific embodiments, the hydroxy keto ester contains at least two hydroxyl groups, at least one ketone/carbonyl group, and at least one ester group. In more specific embodiments, the hydroxylated ester is a beta hydroxy keto ester. The hydroxylated ester may have a molecular weight of about 190 to about 1100. The hydroxylated ester may have a hydroxyl value of about 100 to about 600 mg KOH/g. The hydroxylated ester may have a viscosity of about 150 to about 1200 centipoise at 25° C. The hydroxylated ester may be branched.

Desirably, the hydroxylated ester has an acid value of less than 10 mg KOH/g. Desirably, the hydroxylated ester has a viscosity of less than 600 centipoise at 25° C. The bio-based content should be greater than 99% based on ASTM D6866-20.

The hydroxylated ester can act as a polyol for reacting with a polyisocyanate to form a polyurethane backbone. The hydroxylated ester can also contain a performance-enhancing carbonyl or ketone group which can react with crosslinkers and provide high-performance features. Green chemistry principles are incorporated as well, as some features of the methods disclosed herein include: (a) 100% economical as there are no by-products or small molecule condensates formed during manufacturing; (b) no solvents are used; and (c) the product formed is highly pure and no additional purification step is required. No adverse toxic by-products like dioxin are produced. These resulting molecules are 100% biobased and can be derived from biobased feedstock.

Figure 4:
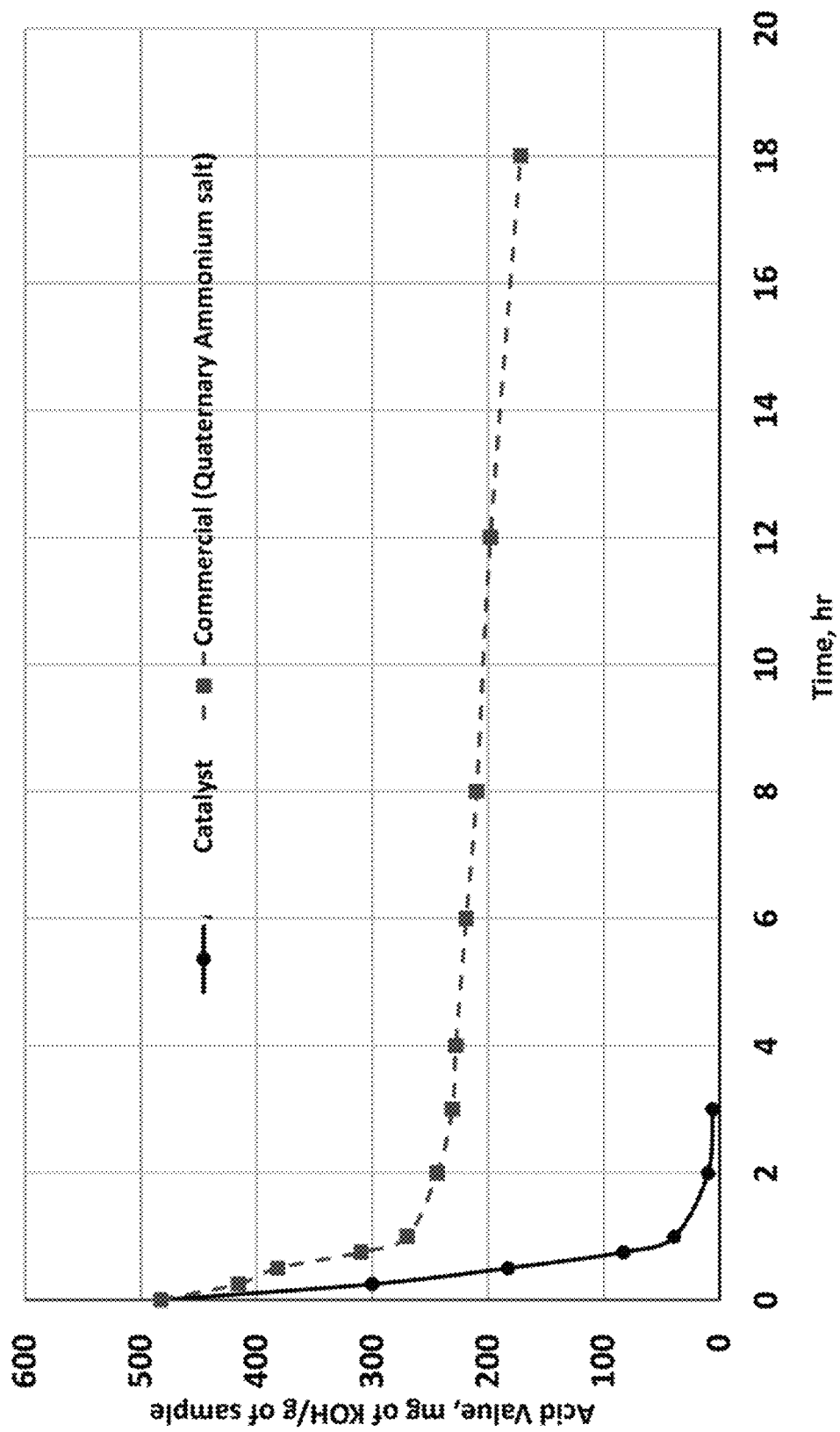
FIG. 4 is a graph comparing a quaternary ammonium salt catalyst with a catalyst of the present disclosure.

The catalysts used in the methods of the present disclosure are highly effective for epoxide ring opening with carboxylate nucleophiles. As a result, the ring opening reaction is fast, well-controlled, and produces the desirable product in quantitative yield. There are no undesirable polyethers formed during the synthesis that would otherwise adversely affect the product performance and cost. FIG. 4 is a graph comparing a quaternary ammonium salt catalyst with the present catalysts. It can be seen that product formation occurs significantly faster with the present catalysts than the quaternary ammonium salt catalyst, as indicated by how quickly the acid value decreases.

The catalyst can be a complex between a transition metal and a carboxylic acid. For example, the catalyst may be a transition metal-Levulinic acid complex. In particular embodiments, the catalyst is iron levulinate; or zinc levulinate; or nickel levulinate; or chromium (III) levulinate. It is noted that chromium (III) is not toxic. Other catalysts may include a mixture comprising choline chloride and levulinic acid, which is a deep eutectic solvent; or a mixture comprising N,N-dimethyl-octylamine and levulinic acid, which is an ionic liquid. Using the same carboxyl-containing molecule in the catalyst avoids contamination by other acids in the final product.

The catalyst may be present in the amount of about 0.2% to about 2.0% (w/w) in the reaction, including from about 0.3 wt % to about 0.6 wt %. The reaction of the carboxyl-containing molecule with the epoxide-containing molecule may occur at a temperature of about 40° C. to about 140° C., including from about 80° C. to about 120° C. Desirably, the reaction time is less than 5 hours.

The physical properties of two different hydroxylated esters of the present disclosure are provided in Table 1 below:

TABLE 1

| Properties | Levupol ™-G | Levupol ™-S |
|---|---|---|
| Molecular Weight (Calculated) | 190.19 | 1091 |
| Number of hydroxyl functionality (Based on structure) | 2 | >3 |
| Hydroxyl Value (mg KOH/g) | 565 ± 15 | 138 ± 20 |
| Acid Value (mg KOH/g) | 0.3 ± 1 | 6 ± 2 |
| Viscosity (cP) @25° C. Spindle# 4; 60 rpm | 200 ± 10 | 980 ± 40 |
| Solubility in selected solvents (20% w/w solute concentration) | | |
| Acetone | Soluble | Soluble |
| MEK | Soluble | Soluble |
| NMP | Soluble | Soluble |
| Cyrene (gamma-valerolactone) | Soluble | Soluble |

Coating formulators are increasingly using polyurethane dispsersions (PUDs) due to environmental and consumer awareness of the health risks associated with hazardous organic solvents. Coatings derived from PUDs have inadequate chemical and mechanical properties due to their inherent hydrophilic properties. To overcome this challenge water-based binders are often reacted with crosslinkers, and the resultant coatings exhibit similar or superior performance compared to their solvent-based counterparts.

One of the best and widely studied crosslinkers for PUDs is diacetone acrylamide. Diacetone acrylamide is generally introduced into the polyurethane backbone via multiple steps and formulated with specified amount of adipic dihydrazide. When the water evaporates from the coating, the ketone group of the diacetone acrylamide reacts with the hydrazide, resulting in the formation of a three-dimensional polymer network. However, the acrylamide is toxic, and there are several technical challenges involved in incorporating the acrylamide monomer into the polyurethane backbone, warranting a safer and process friendly biobased alternative. The hydroxylated esters of the present disclosure can be partially or fully substituted in place of petroleum-based polyols for making PUDs.

The structure of the hydroxylated ester can be varied based on based on the final PUD product requirements, such as solids, viscosity, particle size, thermal and mechanical properties. Based on the chemical structures of the epoxide and carboxylic acid groups, a myriad of functional biobased polyols can be produced to meet the demanding requirements from the coating industry.

High performing specialty Guerbet surfactants can also be prepared using the methods of the present disclosure. Branched alcohols (Guerbet alcohols) are less volatile, less viscous, and have extremely low melting points compared to their linear analogues. They are the only source of raw material for making Guerbet surfactants, and their branched molecular architecture is key to achieving the performance benefits. Guerbet surfactants produced from petroleum-based alkenes require the use of very toxic chemicals. These surfactants are used in industrial chemicals such as antifreezes, soil release agents, cosmetics, and lubricants.

The beta-hydroxy esters of the present disclosure are usually branched and resemble petroleum-derived hydrophobic units, and have a reactive hydroxyl functionality as well. The hydrophobic units can be ethoxylated like conventional non-ionic surfactants too. The hydroxyl groups can be ethoxylated to form a surfactant/stabilizer. The resulting surfactant can be used as a cleaning composition.

Anionic and cationic surfactants can be made with selection of appropriate precursors. For example, taurine (a non-essential amino acid) can be reacted with epoxidized soybean oil to create an anionic surfactant. The carboxyl functional group of any amino acid can be selectively reacted with epoxidized soybean oil, for example, to form a cationic surfactant.

In particular embodiments, the ethoxylated beta-hydroxy ester is a non-ionic surfactant/stabilizer (as determined at a pH in the range of 6 to 8), which does not complex with anionic or cationic surfactants. As will be discussed later, non-ionic stabilizers are especially suitable for use in a non-aqueous system. The ethoxylated beta-hydroxy ester is water-soluble as well. The presence of carbonyl/ketone groups in the beta-hydroxy ester makes it multifunctional and may also provide protection against microbes and/or corrosion.

For surfactants/stabilizers, Table 2 identifies typical screening criteria for determining the suitability/usefulness of the surfactant:

TABLE 2

| Key surfactant properties | Boundary conditions |
| --- | --- |
| Critical micelle concentration (CMC) mgL$^{-1}$ | 25-75 |
| Solvents/Concentration/Operating conditions | AQSS; 1000-2000 mg/L; FR 3.3-8.5 mL/sec |
| Contaminant/Operating conditions | Kerosene (C8-C30); 20000 mg/kg |
| Soil Type/composition | Sand-89.7%; Silt-10%; Clay-0.3% |

AQSS is Aqueous Surfactant System and FR is flow rate

In this regard, water moves oil through a reservoir to a production well, where the oil can be recovered. Using surfactant is particularly helpful for reaching oil trapped in tight pore spaces. Surfactants reduce the surface tension at the oil—water interface, which makes the oil easier to extract. They also change the reservoir rock's wettability so that it is less oil-wet and more water-wet. Water-wet surfaces allow oil to flow more freely within the pore space, whereas oil-wet surfaces tend to attach to the oil and allow water to flow more readily. An oil-wet state is conducive to fluid injection and oil displacement from the rock matrix and into the bulk fluid phase.

Cationic surfactants in particular have been proven highly effective in improving oil recovery in carbonate reservoirs. However, many commonly used surfactants are toxic and costly to manufacture. The surfactants of the present disclosure are derived from epoxidized soybean oil and other generally recognized as safe (GRAS) reagents. For good surfactant efficiency, each molecule has as many as three cationic sites that bind with other substances. The soy-based surfactants of the present disclosure can reduce oil—water interfacial tension (IFT) by 60%. The product can also change the rock's wettability from oil-wet to mixed-wet at concentrations lower than 3 gpt (gallons of surfactant per 1000 gallons of water).

Polyurethane dispersions usually have n-methyl pyrrolidone (NMP) added during the manufacturing process to reduce viscosity and increase water dispersibility. The products of the present disclosure can be combined with one or more diisocyanates to form aqueous polyurethane dispersions that eliminate the need for that expensive solvent while still providing the desired viscosity and dispersibility, which reduces costs, handling, reporting regulations, vapors, and pollution.

The products of the present disclosure can be derived from non-food industrial crops, are non-toxic, and require no additional water treatment costs. They also have a unique polymer structure that is amenable to crosslinking at room temperature. The crosslinked network forms a three-dimensional structure and therefore is expected to provide excellent chemical and mechanical properties. This would also provide an environmentally safer product by reducing volatile organic components.

In another particular application, the hydroxy keto esters of the present disclosure can be used to form polymer particles for encapsulating other molecules/compounds/particles. The polyurethane polymers that are formed contain one or more hydrogen bond acceptor groups due to the use of the hydroxy keto esters, which contain hydrogen bond acceptor groups such as carbonyl groups, carboxyl groups, hydroxyl groups, and other groups containing phosphorus or sulfur. Significantly, these acceptor groups in the polymer shell are stable and do not form covalent bonds with the other molecules/compounds/particles that form the core of the polymer particle.

Generally, at least one hydroxy keto ester, at least one polyhydroxy compound, and at least one diisocyanate are reacted with each other in the presence of a polyurethane catalyst and in a dispersion medium to form polymer particles. The other molecule/compound/particle to be encapsulated by the polyurethane shell desirably does not participate in the polyurethane-forming reaction, but is also present in the reaction mixture.

As explained above, the hydroxy keto ester contains at least one hydroxyl group, at least one ketone group, and at least one ester group. Each hydroxy keto ester may have a molecular weight of about 190 to about 1100. The hydroxy keto ester may be non-ethoxylated or ethoxylated.

In some embodiments, both a non-ethoxylated hydroxy keto ester and an ethoxylated hydroxy keto ester are present. In such embodiments, the amount of the ethoxylated hydroxy keto ester is from about 2 wt % to about 30 wt % of the amount of the non-ethoxylated hydroxy keto ester. Put another way, if the amount of the non-ethoxylated hydroxy keto ester is 100 parts by weight (pbw), the amount of the ethoxylated hydroxy keto ester is about 2 pbw to about 30 pbw, and the total amount of hydroxy keto esters is about 102 pbw to about 130 pbw.

Each polyhydroxy compound contains a minimum of two hydroxyl groups, and in some embodiments may have from 2 to about 12 hydroxyl groups. In other embodiments, each polyhydroxy compound has a hydroxyl value of about 50 to about 1900 mg KOH/g. Non-limiting examples of suitable polyhydroxy compounds include ethylene glycol, diethylene glycol, triethylene glycol, propylene glycol, butane diol, glycerol, trimethylol propane, pentaerythritol, di penta erythritol, sorbitol, dimethylol propionic acid polyols derived from triglycerides, and polyols derived epoxidized triglycerides. Mixtures of different polyhydroxy compounds are also contemplated. The addition of polyhydroxy compounds can further modify the physical properties of the final polymer (e.g. tensile strength or elongation). It is noted that the term "polyhydroxy compound" indicates a compound that is not a hydroxy keto ester.

Non-limiting examples of suitable diisocyanates include toluene diisocyanate; isophorone diisocyanate; hexamethylene diisocyanate; methylene diphenyl isocyanate (4,4'- and 2,4'-isomers); 4,4'-methylene bis (cyclohexyl isocyanate) lysine diisocyanate; 2,2,4-trimethyl-1,6-hexane diisocyanate; polymeric methylene diphenyl isocyanate; polymeric hexamethylene diisocyanate; and 2,2,4-trimethyl-1,6-hexane diisocyanate. Mixtures of different diisocyanates are also contemplated.

The polyurethane catalyst catalyzes the reaction of a hydroxy group with an isocyanate group to form a urethane linkage, and thus the formation of polyurethane particles. Non-limiting examples of suitable polyurethane catalysts include dibutyl tin dilaurate; bismuth neodecanoate; zinc ricinoleate; 1,4-diazabicyclo[2.2.2]octane; diazabicycloundecene; bis(2-dimethylaminoethyl)ether); dimethylaminoethoxyethanol; dimethylethanolamine; dimethylcyclohexylamine; n, n-dimethyldecylamine; and triethylamine, as well as other polyurethane catalysts known in the art.

Generally, polyurethanes can be formed in an aqueous or non-aqueous dispersion medium. For polymer particles that form an encapsulating shell, a non-aqueous (i.e. organic) dispersion medium is used. Non-limiting examples of non-aqueous dispersion media include paraffin oil, hexane, heptane, octane, nonane, decane, dodecane, an isoparaffinic solvent such as ISOPAR®, diesel fuel, gasoline, methyl oleate, methyl soyate, toluene, propylene carbonate, isophorone, diethylene glycol dibutyl ether, or butyl acetate.

Mixtures are also contemplated. It is noted that the dispersion medium may not be liquid at lower temperatures, but is liquid at the reaction temperature due to heating (as described further herein).

Generally, the at least one hydroxy keto ester, the at least one polyhydroxy compound, and the at least one diisocyanate are used in relative amounts such that a molar ratio of isocyanate groups to hydroxyl groups in the reaction mixture after addition is from 0.9 to 1.2.

In some embodiments, the at least one hydroxy keto ester and the at least one polyhydroxy compound are used in relative amounts such that the hydroxy keto ester(s) provide from about 10 mole % to about 70 mole % of the hydroxyl groups and the polyhydroxy compound(s) provide from about 30 mole % to about 90 mole % of the hydroxyl groups which are used in the polyurethane-forming reaction.

The polyurethane-forming reaction may occur by heating the reaction mixture to a temperature of about 30° C. to about 120° C., or in more particular embodiments from about 45° C. to about 90° C. The heating may be applied for a time period of about 1 hour to about 7 hours. The formed polymer particles may then be washed and filtered to isolate the particles.

Figure 5:
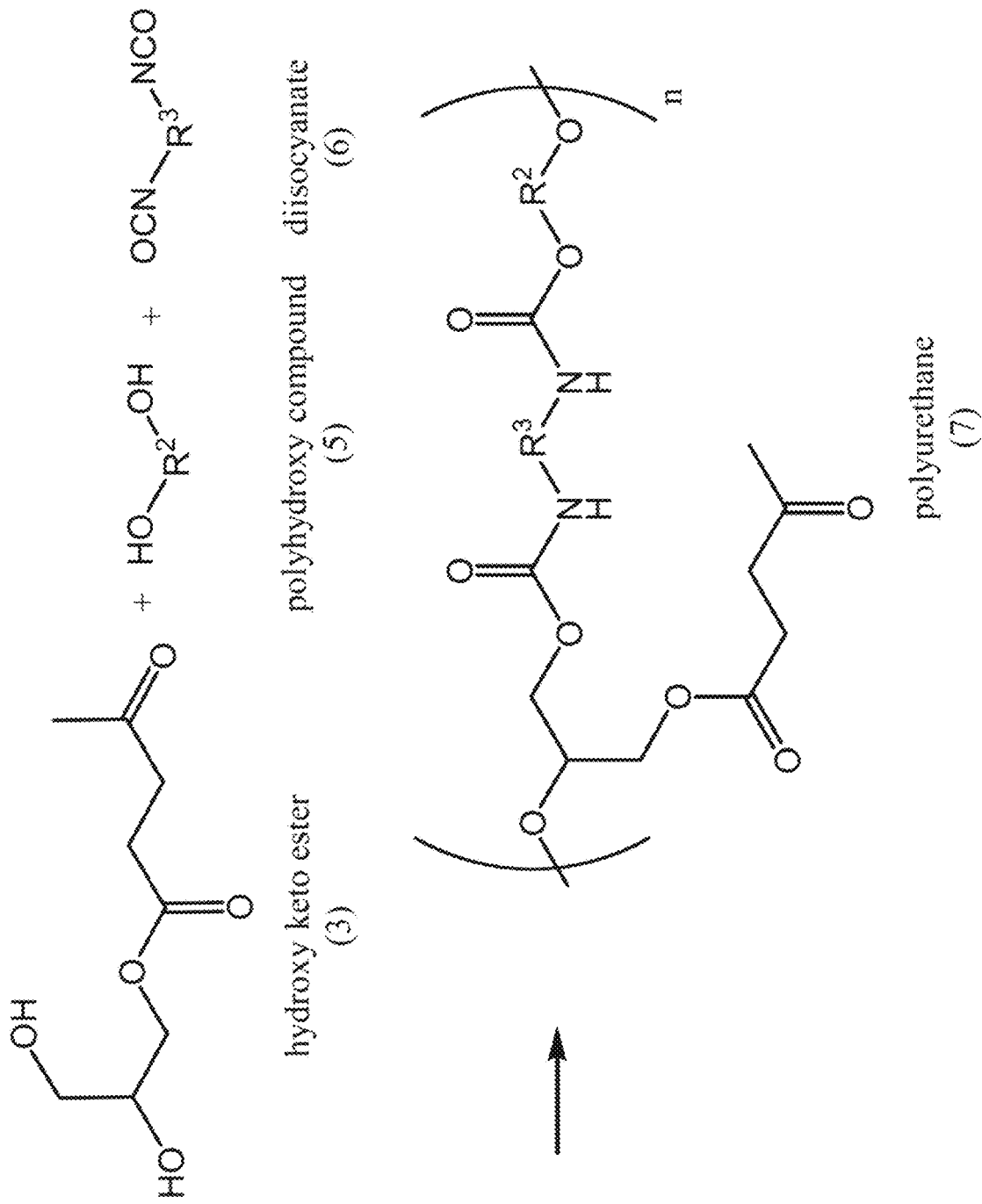
FIG. 5 is a drawing illustrating a fourth example of the methods and products of the present disclosure in which a hydroxy keto ester is reacted with a polyhydroxy compound and a diisocyanate to obtain a polyurethane.

FIG. 5 is a non-limiting illustration of the reaction, where the hydroxy keto ester (3), polyhydroxy compound (5), and diisocyanate (6) react to form the polyurethane (7). $R^2$ and $R^3$ are generally a hydrocarbon (either aliphatic or aromatic). Again, the hydroxy keto ester may vary as described herein.

When forming polymer particles in which a material is encapsulated by a polyurethane shell, the material (e.g. a molecule, compound, or other particle, and also referred to as an active material) is also added to the reaction mixture. In particular embodiments, the active material is a hydrogen bond donor compound. The active material is encapsulated within the polymer particle, or in a core-shell fashion. The hydrogen bond acceptor groups of the polymer shell (formed from the hydroxy keto ester) interact with the hydrogen bond donor compound.

When encapsulating hydrogen bond donor compounds (also known as active material), isocyanate groups may react with the donor compound, which can modify the chemical and physical properties of the donor compound and/or the shell. This modification is not desirable. However, the hydrogen bond acceptor groups in the hydroxy keto ester will form hydrogen bonds with the donor compound, eliminating the unwanted reaction between the isocyanate groups and the active material. This hydrogen bonding also further stabilizes the encapsulated material, which results in improved dispersion of the active material in the dispersion medium and enables a smooth and successful encapsulation process.

Non-limiting examples of hydrogen bond donor compounds can include adenosine, imidazole, imidazoline, choline chloride, cysteine, ascorbic acid, pyridoxine, triazole, nitrilotris(methylene)triphosphonic acid, sorbic acid, benzoic acid, 8-hydroxyquinoline, p-toluene sulfonic acid, and cinnamic acid.

Generally, the polyurethane-forming reaction is controlled by stepwise addition of one of the reactants (containing hydroxy groups or isocyanate groups) to the heated reaction mixture. Thus, two different initial reaction mixtures are contemplated in the present disclosure.

In some particular embodiments, the initial reaction mixture comprises at least one hydroxy keto ester, at least one polyhydroxy compound, a polyurethane catalyst, and a dispersion medium. The initial reaction mixture may also contain an active material that will be encapsulated, such as a hydrogen bond donor compound. The initial reaction mixture does not contain any diisocyanate. At least one diisocyanate is added to this initial reaction mixture during heating to form the polymer particles.

In these embodiments, the initial reaction mixture may comprise from about 2 wt % to about 15 wt % of the at least one hydroxy keto ester; from about 2 wt % to about 15 wt % of the at least one polyhydroxy compound; from about 0.1 wt % to about 5 wt % of the polyurethane catalyst; and from about 40 wt % to about 90 wt % of the dispersion medium.

In other particular embodiments, the initial reaction mixture comprises at least one diisocyanate, a polyurethane catalyst, and a dispersion medium. This initial reaction mixture may also contain an active material that will be encapsulated, such as a hydrogen bond donor compound. This initial reaction mixture does not contain any hydroxy keto ester or polyhydroxy compound. The at least one hydroxy keto ester and at least one polyhydroxy compound are added to this initial reaction mixture during the heating to form the polymer particles.

In these embodiments, the initial reaction mixture may comprise from about 5 wt % to about 20 wt % of the at least one diisocyanate; from about 0.1 wt % to about 5 wt % of the polyurethane catalyst; and from about 80 wt % to about 95 wt % of the dispersion medium.

The final polymer particles may include an active material, or may not include an active material. The final polymer particles desirably are free-flowing. This can be measured using the Carr index as described in ASTM D6393. A Carr index of 15 or lower (i.e. down to zero) indicates good or excellent free-flowing ability.

The final polymer particles may have an average particle size of about 0.5 microns to about 100 microns. Common methods for measuring particle size and distribution include dynamic image analysis (DIA), static laser light scattering (SLS, also called laser diffraction), dynamic light scattering (DLS) and sieve analysis. The average particle size is defined as the diameter at which 50% of the particles have a diameter above the average particle size, and 50% of the particles have a diameter below the average particle size. The size distribution of the particles will be Gaussian, with upper and lower quartiles at 25% and 75% of the stated average particle size, and all particles being less than 150% of the stated average particle size. It is noted that the polymer particles do not have to be spherical. For non-spherical particles, the particle diameter is the diameter of a spherical particle having the same volume as the non-spherical particle.

The following examples are provided to illustrate various aspects of the present disclosure. The examples are merely illustrative and are not intended to limit the disclosure to the materials, conditions, or process parameters set forth therein.

EXAMPLES

Example 1

To determine their effectiveness towards reaction with isocyanates, two different hydroxylated esters prepared according to the present disclosure were reacted with toluene-2,-4 diisocyanate at an NCO/OH ratio of 1.05, with dibutyl tin dilaurate (0.03 wt. %) catalyst in methyl ethyl ketone as solvent (monomer concentration is 30 w/w %).

Figure 6:
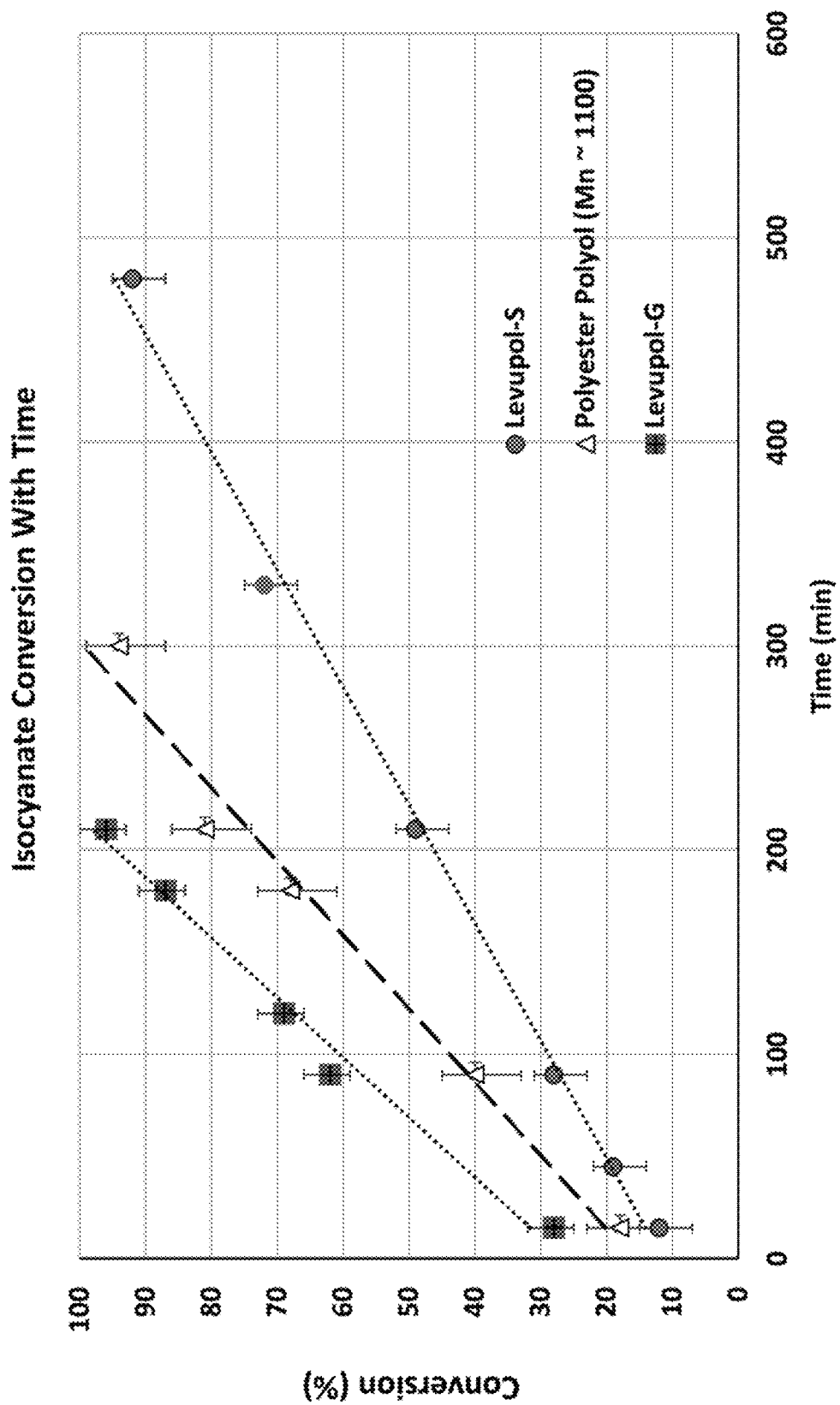
FIG. 6 is a graph comparing different polyols for isocyanate conversion over time.

The results are shown in FIG. 6, along with a commercial polyol (polyester polyol type with number average molecular weight 1100). It is observed that both the Levupol™ grades have reacted with isocyanates efficiently, which is key for forming a polyurethane.

Example 2

Levupol™-G and dimethylol propionic acid-L (synthesized by neutralizing dimethylol propionic acid (DMPA) with triethylamine in equal molar ratio and the resultant liquid product DMPA-L is used as made without any purification) were stirred at room temperature in a 500 ml reactor equipped with a dry argon spurge, a mechanical stirrer, a thermocouple, and a cold-water condenser. The reactants were heated to 70° C. and charged with isophorone diisocyanate (IPDI) over a period of 1 hour. The ratio of NCO/OH was kept at 1.05, the concentration of DMPA-L was 10% on total polymer solids. The reaction was held at 70° C. until the isocyanate content was reached between 1-2%.

The tertiary amine functional group in the DMPA-L acts as a catalyst and therefore there is no need for toxic tin catalyst for the polyurethane forming reaction. The prepolymer was added to distilled water with stirring (600 rpm) to produce the water-based PUD. The property of the PUD is provided in Table 3.

TABLE 3

| | Properties | Levupol ™-G | Levupol ™-G formulated with 10 phr Adipic acid dihydrazide (5% solution in DI water) |
|---|---|---|---|
| Dispersion | Appearance | Transparent dispersion | Transparent dispersion |
| | pH | 7.8 | 7.3 |
| | Viscosity (cP) @25° C. Spindle# 2; 60 rpm | 230 | 202 |
| | Solid content (%) | 48 | 43 |
| | Tg (° C.) | 43 | Not determined |
| Film | Particle Size (nm) | 80 | 96 |
| | MEK DR | 80 | 140 |
| | Water resistance (immersion test) | Hazy in 24 hrs. Recovered in 2 hrs. | Translucent; Recovered in 2 hrs. |

The improved water and chemical resistance properties of the coating derived from Levupol™-G and adipic dihydrazide suggest the keto group from Levupol™-G reacted with the hydrazide functionality and formed a crosslinked polymer network. Structure-activity relationship studies are needed to fully optimize the coating performance.

Example 3

Chromium(III) levulinate, a catalyst for the formation of the hydroxylated ester or hydroxy keto ester, was synthesized.

In a one-liter reactor equipped with a heating, stirring and inert gas assembly, 366 grams of levulinic acid (1.05 moles) was added. The reactor was set at a temperature of 60° C. with stirring speed 300 rpm and constant flow of nitrogen gas. When the temperature reached 60° C., 266.5 grams of chromium (III) chloride (1 mole) was added over a period of 30 minutes. Heating was continued for three hours, until all the solids were completely solubilized, and the product formed was homogeneous. The reactor was then cooled to room temperature. The product, chromium(III) levulinate, was a liquid at room temperature (20° C.).

Example 4

Several different beta hydroxy keto esters were synthesized.

This was done in a reactor equipped with a heating, stirring and gas inlets. Generally, the reactor was heated to a specified set temperature with constant stirring at 300 rpm and constant flow of nitrogen gas. The reaction was continued until the acid value was below 20 mg KOH/g of sample. The acid value was determined as described in ASTM D7253-16, Standard Test Method for Polyurethane Raw Materials: Determination of Acidity as Acid Number for Polyether Polyols.

Table 4 shows eight Inventive Examples, labeled as IE1-IE8. The reactants included several different glycidyl functional molecules, and the amounts of each reactant is in grams. The catalyst used was formed as described in Example 3 above. The set temperatures for each Inventive Example are also provided.

TABLE 4

| | Levupol Formulations | | | | | | | |
|---|---|---|---|---|---|---|---|---|
| | IE1* | IE2 | IE3 | IE4 | IE5 | IE6 | IE7 | IE8 |
| Levulinic acid | 44.8 | 233.1 | 232.8 | 116.5 | 119.1 | 201 | 186.2 | 118 |
| Propylene oxide | 22.2 | | | | | | | |
| Glycerol diglycidylether | | 208 | | | | | | |
| Ethylene glycol diglycidyl ether | | | 175.9 | | | | | |
| Cyclohexene oxide | | | | 99.4 | | | | |
| Epoxidized soybean oil methyl ester | | | | | 319 | | | |
| Epoxidized soybean oil | | | | | | 553 | | |
| 4,4'-Methylenebis(N,N-diglycidylaniline) (TGDDM) | | | | | | | 333.4 | |
| Glycidyl methacrylate | | | | | | | | 140 |
| Catalyst (g) | 0.7 | 4.4 | 4.06 | 2.1 | 4.4 | 7.5 | 5.2 | 1.2 |
| Temperature (° C.) | 60 | 100 | 100 | 80 | 120 | 120 | 100 | 60 |

*IE1 was made in a hydrothermal pressure reactor

The properties of IE1-IE8 are listed in Table 5, from three different measurements. Hydroxyl value was determined using ASTM D4274-05, Standard Test Methods for Testing Polyurethane Raw Materials: Determination of Hydroxyl Numbers of Polyols.

TABLE 5

Properties of hydroxy keto ester

|  | IE1* | IE2 | IE3 | IE4 | IE5 | IE6 | IE7 | IE8 |
|---|---|---|---|---|---|---|---|---|
| Hydroxyl value (mg KOH/g) | 301-318 | 372-390 | 268-281 | 259-278 | 118-132 | 112-132 | 168-178 | 198-220 |
| Acid Value (mg KOH/g) | 4.1-5.2 | 3.8-5.6 | 1.8-3.6 | 9.6-12.8 | 4.7-7.1 | 5.9-6.8 | 14-18.8 | 12-16.6 |
| Viscosity (cps) | 300-450 | 700-880 | 620-780 | 280-392 | 900-1100 | 1600-1800 | 1200-1480 | 403-480 |

Example 5

Next, beta hydroxy keto esters were ethoxylated. IE5 and IE8 were ethoxylated.

To a 2-liter pressure reactor, 50 grams of IE5 and 0.7 grams of powdered potassium hydroxide were added. The mixture was heated to 120° C. and 220 grams of ethylene oxide was continuously introduced into the reactor over a period of two hours and under a pressure of 1200 psi. After addition of ethylene oxide, the reaction continued for an additional 1 hour. The ethoxylated beta hydroxy keto ester product was labeled IE5EO and was collected from the reactor after cooling to 25° C. and releasing the pressure.

Separately, to a 250 mL glass reactor equipped with a heating, stirring and gas inlets was added 10.8 grams of IE8, 40.4 grams of lauryl methacrylate, 24.6 grams of poly(ethylene glycol) methacrylate with average molecular weight of 500 amu. 0.3 grams of 4,4'-azobisisobutyronitrile, 0.1 gram thioglycerol, and 20 mL toluene. The mixture was stirred at 300 rpm under constant nitrogen flow. The reactor was heated to 70° C. for 6 hours. After the reaction time, the reactor was cooled to room temperature under nitrogen blanked to obtain the product, labeled IE 8EO

Example 6

Three different polyurethane powders were made. They were labeled IPUP1-IPUP3. Table 6 identifies the reactants and their amounts in grams. The diisocyanate was toluene 2,4-diisocyanate containing 80% of the 2,4-isomer and 20% of the 2,6-isomer.

In a reactor assembly fitted with heating, stirring and gas inlets, the specified amounts of beta hydroxy keto ester(s), polyhydroxy compounds(s), dibutyl tin dilaurate, and dispersion medium were added. The mixture was heated to 70° C. and stirred at 500 rpm. The diisocyanate was added over a period of 30 minutes. The reaction was carried out until the residual isocyanate content was less than 0.5 wt % as determined by ASTM D5155-01, Standard Test Methods for Polyurethane Raw Materials: Determination of the Isocyanate.

The product was washed with hexane to remove the oil and filtered using a Buckner funnel. The isolated product was free-flowing particles and the particle size was measured using Mastersizer 3000E laser light scattering equipment. Table 6 identifies the reactants (in grams) and also the measured particle size.

TABLE 6

Preparation of polyurethane in powder form

| Reactants |  | IPUP1 | IPUP2 | IPUP3 |
|---|---|---|---|---|
| beta hydroxy keto ester | IE3 | 4 |  |  |
|  | IE6 |  | 4.34 |  |
|  | IE5EO | 0.77 | 2.41 |  |
|  | IE8EO |  |  | 2.12 |
| polyhydroxy compound | Ethylene glycol | 2.44 | 2.75 | 1.53 |
|  | Triazinetriethanol |  |  | 3.6 |
| Catalyst | Dibutyl tin dilaurate | 0.15 | 0.2 | 0.15 |
| Dispersion medium | Paraffin oil | 62 | 65 | 58 |
| Isocyanate | Toluene 2,4-disiocyanate | 9.1 | 9.08 | 9.12 |
| Particle size (microns) |  | 50-75 | 20-30 | <10 |

Example 7

A comparison was performed between a formulation with the hydroxylated ester, and a formulation without the hydroxylated ester in the encapsulation of sorbic acid.

To a 250 mL glass reactor assembly fitted with heating, stirring and gas inlets, was added 2.58 grams IE8EO, 2.44 grams ethylene glycol, 1.44 triazinetriethanol, 0.13 grams dibutyl tin dilaurate, and 52 grams paraffin oil. The mixture was stirred at 500 rpm. The mixture was heated to 70° C. and 3.9 grams sorbic acid was added. After addition, the mixture was stirred for 30 minutes until all the solids were completely dispersed. Next, 9.1 grams of toluene 2,4-diisocyanate was added over a period of 30 minutes. The reaction was carried out until the residual isocyanate content was less than 0.5 wt %. The product was washed with hexane to remove the oil and filtered using a Buckner funnel. The isolated product was free-flowing particles with a particle size ranging between 2 microns and 20 microns.

As a comparative example, the above experiment was carried out, but without the presence of IE8EO. To the 250 mL glass reactor assembly was added 2.33 grams ethylene glycol, 1.37 triazinetriethanol, 0.12 grams dibutyl tin dilaurate, 50 grams paraffin oil. The mixture was stirred at 500 rpm. The mixture was heated to 70° C. and 3.7 grams sorbic acid was added. After addition, the mixture was stirred for 30 minutes until all the solids were completely dispersed. Next, 8.7 grams of toluene 2,4-diisocyanate was added over a period of 30 minutes. The reaction produced a gummy mass and did not result in the formation of a free-flowing powder.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A method of forming polymer particles, comprising:
heating an initial reaction mixture that comprises at least one hydroxy keto ester, at least one polyhydroxy compound, a polyurethane catalyst, and a dispersion medium, wherein the at least one polyhydroxy compound is not a hydroxy keto ester; and
adding at least one diisocyanate to the initial reaction mixture during the heating to form the polymer particles.

2. The method of claim 1, wherein the initial reaction mixture comprises:
from about 2 wt % to about 15 wt % of the at least one hydroxy keto ester;
from about 2 wt % to about 15 wt % of the at least one polyhydroxy compound;
from about 0.1 wt % to about 5 wt % of the polyurethane catalyst; and
from about 40 wt % to about 90 wt % of the dispersion medium.

3. The method of claim 1, wherein the initial reaction mixture further comprises at least one hydrogen bond donor compound.

4. The method of claim 3, wherein the polymer particles are in the form of a shell and a core;
wherein the shell is formed from reaction of the at least one hydroxy keto ester, the at least one polyhydroxy compound, and the at least one diisocyanate; and
wherein the core comprises the at least one hydrogen bond donor compound.

5. The method of claim 1, wherein the initial reaction mixture is heated to a temperature of about 30° C. to about 120° C.; or
wherein the initial reaction mixture is heated for a time period of about 1 hour to about 7 hours.

6. The method of claim 1, wherein the at least one hydroxy keto ester comprises a non-ethoxylated hydroxy keto ester and an ethoxylated hydroxy keto ester.

7. The method of claim 6, wherein an amount of the ethoxylated hydroxy keto ester is from about 2 wt % to about 30 wt % of an amount of the non-ethoxylated hydroxy keto ester.

8. The method of claim 1, wherein a sufficient amount of the at least one diisocyanate is added to the initial reaction mixture is such that a molar ratio of isocyanate groups to hydroxyl groups after addition is from 0.9 to 1.2.

9. The method of claim 1, wherein the at least one polyhydroxy compound has from 2 to about 12 hydroxyl groups, or
wherein the at least one polyhydroxy compound has a hydroxyl value of about 50 to about 1900 mg KOH/g; or
wherein the at least one hydroxy keto ester has a molecular weight of about 190 to about 1100.

10. The method of claim 1, wherein the dispersion medium is a non-aqueous medium.

11. The method of claim 1, wherein the polymer particles have a Carr index of 15 or less; or
wherein the polymer particles have an average particle size of about 0.5 microns to about 100 microns.

12. Polymer particles produced by the method of claim 1.

13. A method of forming polymer particles, comprising:
heating an initial reaction mixture that comprises at least one diisocyanate, a polyurethane catalyst, and a dispersion medium; and
adding at least one hydroxy keto ester and at least one polyhydroxy compound to the initial reaction mixture during the heating to form the polymer particles, wherein the at least one polyhydroxy compound is not a hydroxy keto ester.

14. The method of claim 13, wherein the initial reaction mixture comprises:
from about 5 wt % to about 20 wt % of the at least one diisocyanate;
from about 0.1 wt % to about 5 wt % of the polyurethane catalyst; and
from about 80 wt % to about 95 wt % of the dispersion medium.

15. The method of claim 13, wherein the initial reaction mixture further comprises at least one hydrogen bond donor compound.

16. The method of claim 13, wherein a sufficient amount of the at least one hydroxy keto ester and the at least one polyhydroxy compound is added to the initial reaction mixture is such that a molar ratio of isocyanate groups to hydroxyl groups after addition is from 0.9 to 1.2.

17. A method for forming a hydroxy keto ester, comprising:
reacting a carboxyl-containing molecule that also contains at least one carbonyl group with an epoxide-containing molecule in the presence of a catalyst to obtain the hydroxy keto ester;
wherein the catalyst is a complex between a transition metal and a carboxylic acid.

18. The method of claim 17, wherein the carboxyl-containing molecule contains multiple carbonyl groups.

19. The method of claim 17, further comprising ethoxylating the hydroxy keto ester.

20. The hydroxy keto ester produced by the method of claim 17.

* * * * *